United States Patent Office 3,456,343
Patented July 22, 1969

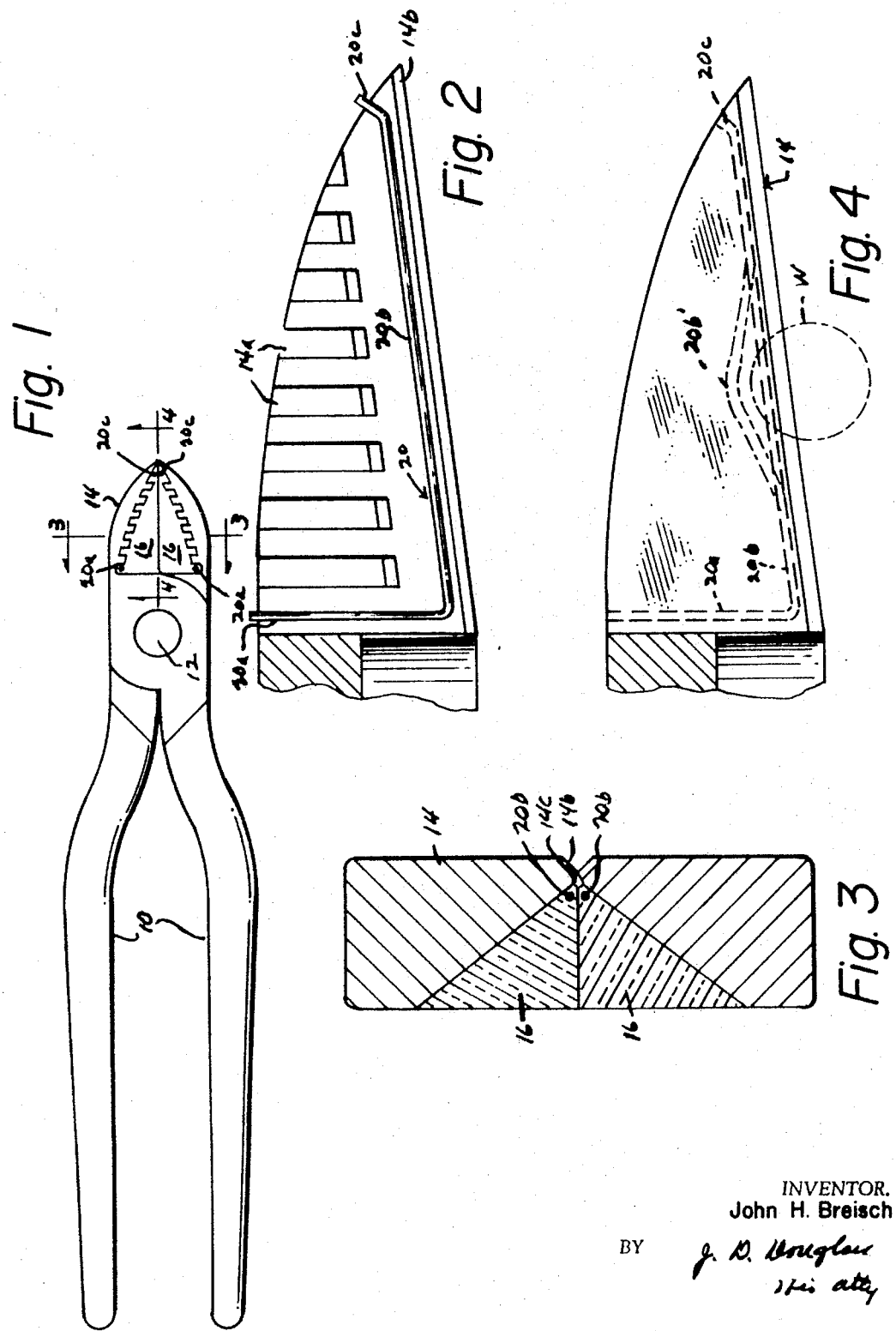

3,456,343
WIRE CUTTING PLIERS HAVING REINFORCED RESILIENT MATERIAL HOLDING MEANS
John H. Breisch, 2103 Arthur Ave., Lakewood, Ohio 44107
Filed June 25, 1968, Ser. No. 739,839
Int. Cl. B26b 17/00, 27/00
U.S. Cl. 30—124                                           5 Claims

ABSTRACT OF THE DISCLOSURE

A pair of cutting pliers have jaws with cutting edges. The jaws define a recess which is filled with a resilient plastic material, extending to the cutting edges and separated into two parts on a parting line perpendicular to the cutting edge, for holding a piece of wire that is cut off. A resilient wire reinforcement is disposed in the plastic coextensive with the plastic and adjacent the cutting edge. This wire allows the plastic to be deformed at the cutting edge, always returning the plastic to its original position with a wiping action.

---

This invention relates to cutting pliers of the so-called diagonal type. It is an improvement over that shown in Patents 2,302,810 and 2,814,869.

Pliers of the above type are used for the cutting of wire. When wire is cut during the assembly of certain electrical apparatus it is desirable to prevent the pieces that are cut off from dropping into the circuitry where they could subsequently cause undesirable short circuits. Therefore, the hollowed out jaws were filled with resilient plastic which provided resilient gripping surfaces for engaging with the cut off piece to hold it until the jaws were opened at some place remote from the circuitry where the piece could be dropped out.

Apparently the use of plastic up to the cutting edges entailed a problem because the plastic at the cutting edge was deformed and pulled away from the metal to which it was attached. This allowed dirt to accumulate between the plastic and the jaw body, eventually causing a complete separation of the plastic from the jaw. Patent No. 2,814,869 was supposed to cure this defect by the expedient of forming a groove in the plastic adjacent the cutting edge so that there was no plastic at the cutting edge to be deformed.

Although the last-mentioned expedient was more or less successful it had the disadvantage that the plastic did not go entirely to the edge and there was not a firm grip on the part being cut. Furthermore, if large wire was cut there was still some deformation of the plastic.

The present invention contemplates a pair of pliers where the plastic is carried up to the cutting edge and is reinforced adjacent the cutting edge by a resilient piece of wire. This enables the plastic to be deformed at the cutting edge and the wire causes the plastic to return to its original position during which return any extraneous matter is dislodged with a wiping action from the metal where the plastic was displaced.

Still other advantages of the invention and the invention itself will become more apparent from the following description of an embodiment thereof, which is illustrated by the accompanying drawings and forms a part of this specification.

In the drawings:
FIG. 1 is a plan view of a pair of diagonal cutters embodying the invention;
FIG. 2 is a fragmentary enlarged plan view of one of the jaws showing the position of the reinforcing wire before the plastic is in position;

FIG. 3 is an enlarged section on the line 3—3 of FIG. 1; and
FIG. 4 is an enlarged fragmentary view taken from the line 4—4 of FIG. 1.

Referring to the drawings, throughout which like parts are designated by like reference characters, a pair of completed pliers is shown in FIG. 1 and consists of a pair of operating handles 10 pivoted together at 12 and having a pair of recessed jaws 14, the recess between the jaws being filled with a resilient plastic 16, all of which is old in the art.

As best shown in FIG. 2, each jaw is provided with spaced ribs 14a within the recess to which the plastic is bonded. The pliers are first constructed to the stage where the plastic and its reinforcement is to be inserted, then a reinforcing wire 20 is laid in the recess adjacent the cutting edge 14b, as shown in FIG. 2. The wire has a leg 20a which extends along the base of the recess and then is bent at a right angle to form the part 20b which extends along in close proximity to the cutting edge 14b. At the end the wire bends outwardly at 20c away from the cutting edge. There are many ways that the wire can be held in position while the plastic is being placed in position around the wire and in the recess which is beyond the scope of the invention being claimed. The plastic is then placed in the recesses around the reinforcing wire and bonded to the inner surface of the jaws.

After the plastic is in position and cured, the ends of the wire part 20a and 20c, which project beyond the plastic, are ground or cut off.

The position of the reinforcing wire, which is of small diameter and of highly resilient material, such as steel, is best shown in FIGS. 3 and 4. By viewing FIG. 3 it will be noted that the wire is substantially completely surrounded by the plastic which extends up to the cutting edge. In this instance the cutting edge includes the outer surface 14b and the inner ground surface 14c. The width of the inner ground surface may vary and, in some instances, may be minimal. If the surface is narrower the wire could be even closer to the apices of the cutting edge which come together when the jaws are closed, although the wire does not necessarily have to be as close as shown and the position relative to the cutting edge have some variance due to manufacturing tolerances.

The wire could also be slightly spaced from the metal of the jaw with more plastic between the wire and the jaw. The critical thing about the position of the wire is that it preferably be close to the cutting edge and be so embedded in the plastic that it serves as a resilient reinforcement for the plastic in that portion which is apt to be deformed during a wire cutting operation. This deformation is best shown in FIG. 4, where a portion of a wire being cut is shown at W in cross-section. It will be noted that the wire W has engaged with the plastic and caused it to move along with the reinforcing wire 20b. The wire is thus deformed from its normally straight contour, as shown in dashed lines, to an inwardly bowed contour as shown in the dash dot lines at 20b'. The bowing of the reinforcing wire is a progressive action which increases to maximum as the cutting progresses, the maximum amount of bowing being determined by the size of the wire being cut. In very small wire, the bowing is minimal.

After the wire is cut, the combined resiliency of the plastic, reinforced by the reinforcing wire, causes the plastic and reinforcing wire to return to their normal positions. Of particular interest is the fact that the leg 20a of the reinforcing wire being embedded in the plastic, prevents that wire from rotating about its axis and also causes the part 20b to remain in its position, except for the bending relative to the metal of the jaw.

It will be noted from FIG. 4 that there is a certain amount of plastic between the bent reinforcing wire and the wire being cut which is intended to indicate the fact that the plastic moves away from the cutting edge of the jaw in a zone on each side of the wire being cut. During this movement, however, the leg 20a keeps the reinforcing wire spacially substantially its original distance from the metal and it is believed actually causes a slight increase in pressure of the plastic against the metal. When the cut wire is removed, the reinforcing wire along with the plastic returns to their normal position.

The result is that the plastic is held close to the metal and on its return a wiping action occurs which prevents foreign material from accumulating between the plastic and the metal.

Although a reinforcing wire of round cross-section has been shown, that being the preferred embodiment, the wire could be square, triangular or diamond shape.

It will be apparent from the foregoing that the gripping of the very short or long ends of cut wire is not impaired and a particular advantage is that large wires may be cut and the bond of the plastic adjacent the cutting edge be disrupted without any detrimental effect.

What is claimed is:

1. A pair of cutting pliers including a pair of handles pivoted together and having cutting jaws extending beyond the pivot point, said cutting jaws being recessed and having a wide base and extending to a point and having a pair of meeting cutting edges, said recesses being filled with a resilient gripping material extending to the cutting edge and separated into two parts on a parting line perpendicular to the cutting edge and extending longitudinally parallel to cutting edges for substantially the full length thereof, reinforcing means for said resilient material of each jaw disposed in the resilient material in closely spaced relation to the cutting edge and extending parallel thereto.

2. A device as described in claim 1 wherein said reinforcing means is a highly resilient wire and extends substantially the full length of the cutting edge.

3. A device as described in claim 2 wherein said wire is provided with a portion extending at an angle to said reinforcing portion and is embedded in said gripping material.

4. A device as described in claim 3 wherein said angular portion of the wire is disposed near the base of each jaw.

5. A device as described in claim 4 wherein the outer end of said reinforcing wire extends at an angle to the reinforcing portion near the point of the jaw.

References Cited

UNITED STATES PATENTS

| | | | |
|---|---|---|---|
| 1,862,556 | 6/1932 | Welhaven | 30—124 |
| 2,302,810 | 11/1942 | Steegmuller | 30—124 |
| 2,814,869 | 12/1957 | Matson | 30—124 |
| 2,938,266 | 5/1960 | Klein | 30—124 |

FOREIGN PATENTS 400,951    4/1966    Switzerland.

MYRON C. KRUSE, Primary Examiner

U.S. Cl. X.R.

30—134